US006462873B1

(12) United States Patent
Kwok et al.

(10) Patent No.: US 6,462,873 B1
(45) Date of Patent: Oct. 8, 2002

(54) POLARIZING BEAM SPLITTER

(76) Inventors: Hoi Sing Kwok, Senior Staff Quarter, Tower 7, 9B, The HK University of Science & Technology, Clear Water Bay (HK); Hai-Feng Li, Senior Staff Quarter Tower 7, 9B, The Hong Kong University of Science and Technology, Clear Water Bay, Kowloon (HK)

( * ) Notice: Subject to any disclaimer, the term of this patent is extended or adjusted under 35 U.S.C. 154(b) by 28 days.

(21) Appl. No.: 09/617,033

(22) Filed: Jul. 14, 2000

(51) Int. Cl.[7] .......................... G02B 27/28; G02F 1/1335
(52) U.S. Cl. ........................... 359/487; 359/485; 349/9; 353/20; 362/19
(58) Field of Search ................................. 359/487, 485, 359/483, 498; 349/5, 9; 353/20; 362/19

(56) References Cited

U.S. PATENT DOCUMENTS

| 2,403,731 | A | * | 7/1946 | MacNeille | 359/487 |
| 5,357,370 | A | * | 10/1994 | Miyatake et al. | 359/487 |
| 5,453,859 | A | * | 9/1995 | Sannohe et al. | 359/487 |
| 5,579,138 | A | * | 11/1996 | Sannohe et al. | 359/583 |
| 5,625,491 | A | * | 4/1997 | von Gunten et al. | 359/487 |
| 5,967,635 | A | * | 10/1999 | Tani et al. | 359/498 |
| 6,078,363 | A | * | 6/2000 | Masuda et al. | 349/9 |
| 6,285,423 | B1 | * | 9/2001 | Li et al. | 349/117 |
| 6,317,264 | B1 | * | 11/2001 | Li et al. | 359/487 |

FOREIGN PATENT DOCUMENTS

WO    WO 98/07279    * 2/1998

OTHER PUBLICATIONS

L. Li, et al., "Visible broadband, wide–angle, thin–film multilayer polarizing beam splitter", Applied Optics, vol. 35, No. 13, pp. 2221–2225. May 1, 1996.*
Li, et al, "Novel Thin Film Polarizing Beam–Splitter and Its Application in High Efficiency Projection Displays", Part of the IS&T/SPIE Conference on Projection Displays, San Jose, California, Jan. 1999, pp. 52–62.

* cited by examiner

Primary Examiner—Cassandra Spyrou
Assistant Examiner—John Juba, Jr.
(74) Attorney, Agent, or Firm—Burns, Doane, Swecker & Mathis, L.L.P.

(57) ABSTRACT

A polarizing beam splitter is described that is optimised not for the maximum possible extinction ratio, but to provide a wide acceptance angle over substantially the whole visible range while still providing an adequate extinction ratio for use in specific applications such as a LCD projector display.

18 Claims, 6 Drawing Sheets

LCD panel

POLARIZING BEAM SPLITTER

FIELD OF THE INVENTION

This invention relates to a polarizing beam splitter (PBS), and in particular to a PBS which is capable of operating over a wide wavelength region and having a large numerical aperture.

BACKGROUND OF THE INVENTION AND PRIOR ART

Polarizers are used in many optical systems to control the polarization state and transmission properties of light. One particular form of polarizer is known as the polarizing beam splitter (PBS) and a conventional type of PBS (known as a MacNeille type) is shown in FIG. 1. A PBS has the property that it transmits light polarized in one direction and reflects light polarized in the orthogonal direction. Usually, p-polarized light is transmitted and the s-polarized light is reflected. Such a PBS usually has a cubic shape, with the angle of incidence on the polarizing coating being 45°. The polarizing coating comprises a multi-layer stack of dielectric materials having high and low refractive indices. The dielectric coating stack is optimized to give a wide separation of the reflectance of the s- and p-polarized lights, and at the same time, maintain a large difference in their reflectance. A large difference in reflectance gives a large extinction ratio, which is an important criterion for a good PBS.

This type of PBS has the drawback, however, that the numerical aperture is small. A small numerical aperture implies a small acceptance angle and a large F-number for the optical system. Common commercial polarizing beam splitters have an acceptance angle of ±2°. This corresponds to an F-number of F/10. In order to achieve a larger numerical aperture, the working bandwidth has to be sacrificed. Thus it is difficult to achieve both wide bandwidth and large acceptance angle operation.

However, for many important applications it would be highly desirable to obtain a PBS with a wide bandwidth and a large numerical aperture at the same time. One of these applications is in reflective liquid crystal light valve based projection displays. Due to the divergence angle of the light source, which is typically an arc lamp, the F-number has to be small. Thus a PBS capable of operating at small F-numbers and having a large numerical aperture or large acceptance angle is needed. The following table shows the relationship between these quantities:

TABLE I

Relationship between F# and the beam cone angle

| F# | NA | θ in air | θ in glass (1.5) |
|---|---|---|---|
| 3.0 | 0.17 | 9.6 | 6.4 |
| 3.5 | 0.14 | 8.2 | 5.5 |
| 3.8 | 0.13 | 7.6 | 5.0 |
| 4.0 | 0.125 | 7.2 | 4.8 |
| 4.5 | 0.11 | 6.4 | 4.25 |

Li et al (L. Li, J. A. Dubrowolski, R. T. Sullivan and Z. Pang, "*Novel Thin Film Polarizing Beam Splitter and Its Application in High Efficiency Projection Displays*", Projection Displays V. M. H. Wu ed., *SPIE Proceedings* Vol. 3634, pp.52–62, 1999) described a different PBS based on birefringent materials. The design of Li et al gives an acceptance angle of more than ±7° and works over the entire visible wavelength range. However, the drawback is that the angle of incidence has to be 70° making the device rather large and difficult to use.

SUMMARY OF THE INVENTION

The present invention provides a design for a PBS that is capable of large numerical aperture and can operate over the entire visible wavelength range in order to fulfill the requirement of both broadband and large acceptance angle operations.

According to the present invention therefore there is provided a polarizing beam splitter comprising a coating sandwiched between two glass prisms, said coating comprising alternating layers of a first material having a first relatively high refractive index and a second material having a second relatively low refractive index, wherein the refractive indices of the first and second coatings, the optical thickness of each layer of the coating, and the refractive index of the glass prisms are chosen such that the coating is capable of transmitting light of a first polarization with at least 80% efficiency over a wavelength range of about 440 nm to 680 nm and reflecting light of a second polarization with at least 80% efficiency over a wavelength range of about 440 nm to 680 nm, wherein the transmission and reflectance efficiencies are maintained when the incident light is at an angle of up to ±5° from an optimum incident angle.

Preferably, the transmission and reflectance efficiencies are maintained at angles of up to ±7° from the optimum incident angle.

Preferably p-polarized light is transmitted and s-polarized light is reflected.

The optimum incident light angle may be selected to be 45±2° or 52±2°.

In a first embodiment of the invention the coating comprises 19 layers alternately of ZnS with a refractive index of 2.35 and $MgF_2$ with a refractive index of 1.38, and wherein said glass prisms have a refractive index of 1.69.

In a second embodiment of the invention the coating comprises 27 layers alternately of $HfO_2$ with a refractive index of 1.98 and $SiO_2$ with a refractive index of 1.46, and wherein said glass prisms have a refractive index of 1.52 and 64 respectively.

In a third embodiment of the invention the coating comprises 19 layers alternately of ZnS with a refractive index of 2.35 and $MgF_2$ with a refractive index of 1.38, and wherein said glass prisms have a refractive index of 1.52.

In a fourth embodiment of the invention the coating comprises 25 layers alternately of $HfO_2$ with a refractive index of 1.98 and $SiO_2$ with a refractive index of 1.46, and wherein said glass prisms have a refractive index of 1.52.

According to the present invention there is further provided a LCD projector display comprising a LCD array, an input light source, and a polarizing beam splitter adapted to polarize incident light from said input light source and to direct said polarized light onto said LCD array and to transmit light reflected and repolarized from said LCD array, wherein said beam splitter comprises a coating sandwiched between two glass prisms and is adapted to transmit light of a first polarization with at least 80% efficiency over a wavelength range of about 440 nm to 680 nm and to reflect light of a second polarization with at least 80% efficiency over a wavelength range of about 440 nm to 680 nm, wherein the transmission and reflectance efficiencies are maintained when the incident light from said light source is at an angle of up to ±5° from an optimum incident angle.

In a preferred arrangement the display may further comprise a pre-polarizer located between said input light source and said beam splitter, and/or a post-polarizer located between said beam splitter and an output.

Preferably the transmission and reflectance efficiencies are maintained when the incident light is at an angle of up to ±7° from said optimum incident angle. Preferably p-polarized light is transmitted and s-polarized light is reflected. In preferred embodiments of the display of the present invention, the optimum incident angle is 45±2° or 52±2°.

In one specific embodiment of the invention the coating comprises 19 layers alternately of ZnS with a refractive index of 2.35 and $MgF_2$ with a refractive index of 1.38, and wherein said glass prisms have a refractive index of 1.69.

In a second specific embodiment of the invention the coating comprises 27 layers alternately of $HfO_2$ with a refractive index of 1.98 and $SiO_2$ with a refractive index of 1.46, and wherein said glass prisms have a refractive index of 1.52 and 1.64 respectively.

In a third specific embodiment of the invention the coating comprises 19 layers alternately of ZnS with a refractive index of 2.35 and $MgF_2$ with a refractive index of 1.38, and wherein said glass prisms have a refractive index of 1.52.

In a fourth specific embodiment of the invention the coating comprises 25 layers alternately of $HfO_2$ with a refractive index of 1.98 and $SiO_2$ with a refractive index of 1.46, and wherein said glass prisms have a refractive index of 1.52.

BRIEF DESCRIPTION OF THE DRAWINGS

Some embodiments of the invention will now be described by way of example and with reference to the accompanying figures, in which.

DETAILED DESCRIPTION OF PREFERRED EMBODIMENTS

Figure 2:
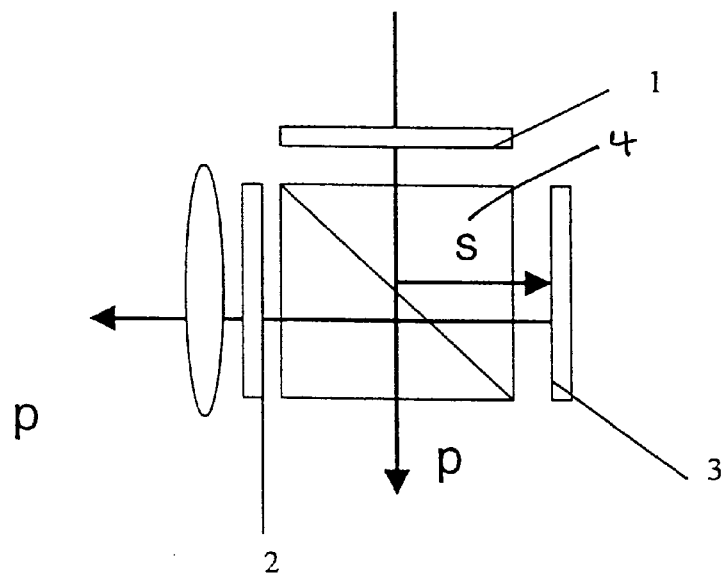
FIG. 2 shows the use of a PBS in a conventional LCD display.

An object of the present invention is to provide a PBS for a reflective liquid crystal based projector. In reflective LCD projectors, the polarizing prism 4 and the reflective LCD panel 3 are usually arranged as shown in FIG. 2. Input light enters the prism 4 (through an optional linear polarizer 1) and the s-polarized light is reflected by the multilayer coating in the prism 4 and illuminates the LCD panel 3. The LCD panel transforms part of the light into p-polarization and reflects it back to the prism. The PBS then passes through this p-polarized light which is subsequently projected onto the screen through an optional post-polarizer 2 and projection lens 5.

For the system as shown in FIG. 2, if the input light is unpolarized, we can write the intensity of the illuminating light on the LCD panel as:

$$I = R_s + R_p \tag{1}$$

The light output onto the screen for the bright state is:

$$I_{on} = R_s T_p + R_p T_s \tag{2}$$

where $R_s$, $R_p$, $T_s$, $T_p$ are the reflectance and the transmittance of s- and p-polarized light of the PBS respectively. Here it is assumed that the input light is perfectly randomly polarized and the LCD panel is ideal, i.e. it can turn all the s-polarized light into p-polarized light and the reflectance of LCD is 100%. Likewise, the dark state on the screen is given by $$I_{off} = R_s T_s + R_p T_p \tag{3}$$

For the PBS, both $R_p$ and $T_s$ are much smaller than $R_s$ and $T_p$ so that they can be neglected in eq. (2). A similar approximation, however, cannot be made for eq. (3). If the efficiency $\eta$ of the PBS is defined as the on-state light intensity, then:

$$\eta = R_s T_p \tag{4}$$

The contrast ratio C of the projector is defined by $$C = \frac{I_{on}}{I_{off}} = \frac{R_S T_P + R_P T_S}{R_P P_P + R_S T_S} \approx \frac{R_S T_P}{R_P T_P + R_S T_S} = \frac{1}{\left(\frac{R_S}{R_P}\right)^{-1} + \left(\frac{T_P}{T_S}\right)^{-1}} \tag{5}$$

where $R_s/R_p$ and $T_p/T_s$ are the extinction ratios for reflection and transmission directions of the PBS respectively.

Figure 1:
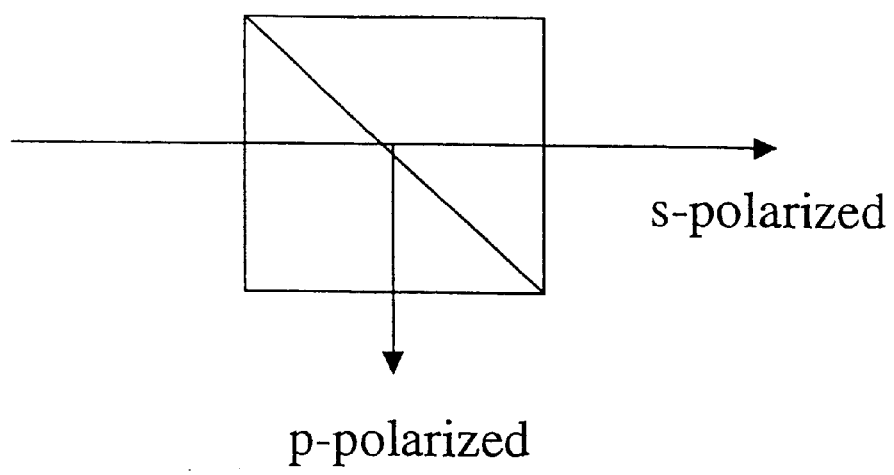
FIG. 1 shows a conventional polarizing beam splitter (PBS)

From eq. (5) it can be seen that high extinction ratio of both reflection and transmission is needed in order to obtain a high contrast ratio. But this is impossible for a conventional PBS of the type shown in FIG. 1 with broadband and wide incident angular range. What can be done, however, is to compromise and to obtain broadband operation at the expense of lowered extinction ratios. In this case, it is possible to approximate eqs. (4) and (5) by $$\eta \approx T_p \tag{6}$$

$$C \approx \frac{T_P}{T_S} \tag{7}$$

As a consequence, in the prior art the objective for the optimization of the coating stack is to get $T_p$ as high as possible with a certain high contrast ratio. For a conventional PBS, the objective is to obtain very high $T_p/T_s$ such as a few thousands to one. However, this is unnecessary in the case of a projector because the contrast ratio required usually is only about 256:1. Therefore, in the preferred embodiments of the present invention, the extinction ratio is set to be about this value as well. More importantly, $T_p$ has to be as high as possible over the entire visible range.

The conventional PBS is based on Brewster reflection. In order to get the maximum performance of the prism, the refractive index of the prism glass ($n_g$), the refractive indices of the coating materials ($n_L, n_H$) and the reflecting angle $\phi$ should satisfy the following equation:

$$\sin^2\theta = \frac{n_H^2 n_L^2}{n_g^2(n_H^2 + n_L^2)} \quad (8)$$

Therefore, a proper choice of the materials and of the refractive indices is necessary in order for $\phi$ to be 45°. Conversely, the material choice can be relaxed if $\theta$ is allowed to be non-45°.

In the preferred embodiments of the present invention, several coating materials, ZnS, ZnO, HfO$_2$, SiO$_2$ and MgF$_2$ may be used. In addition a variety of glass materials as the substrate material of the PBS may be employed. The refractive indices of common materials are listed in

TABLE II

| Material | Refractive index |
|---|---|
| BK7 glass | 1.52 |
| ZnS | 2.35 |
| ZnO | 2.02 |
| HfO$_2$ | 1.98 |
| SiO$_2$ | 1.46 |
| MgF$_2$ | 1.38 |

The various combinations of coating materials give rise to the following required substrate refractive indices for the glass according to eq. (7):

| $n_H$ | $n_L$ | $n_g$ (45) | $n_g$ (48) | $n_g$ (50) | $n_g$ (52) |
|---|---|---|---|---|---|
| 2.35 | 2.02 | 2.166351 | 2.061879 | 1.999072 | 1.945458 |
| 2.35 | 1.98 | 2.141367 | 2.0381 | 1.976018 | 1.923021 |
| 2.35 | 1.46 | 1.753818 | 1.66924 | 1.618394 | 1.574988 |
| 2.35 | 1.38 | 1.682883 | 1.601726 | 1.552936 | 1.511287 |
| 2.02 | 1.98 | 1.999681 | 1.903246 | 1.845272 | 1.795782 |
| 2.02 | 1.46 | 1.673398 | 1.592698 | 1.544184 | 1.502769 |
| 2.02 | 1.38 | 1.611449 | 1.533736 | 1.487018 | 1.447136 |
| 1.98 | 1.46 | 1.661803 | 1.581662 | 1.533483 | 1.492356 |
| 1.98 | 1.38 | 1.601086 | 1.523873 | 1.477455 | 1.43783 |
| 1.46 | 1.38 | 1.418297 | 1.349899 | 1.308781 | 1.273679 |

In this Table, the refractive index of the glass substrate required for any combination of high and low index coating materials, for any angle of incidence of 45°, 48°, 50° and 52° are listed. In particular, the cases where the glass refractive index is near 1.52, then BK7 glass can be used. Otherwise, other kinds of glass having appropriate refractive indices may be used.

Figure 3:
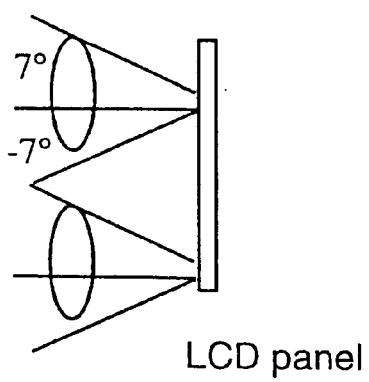
FIG. 3 shows the light cone of incident light on a LCD display.
Figure 4:
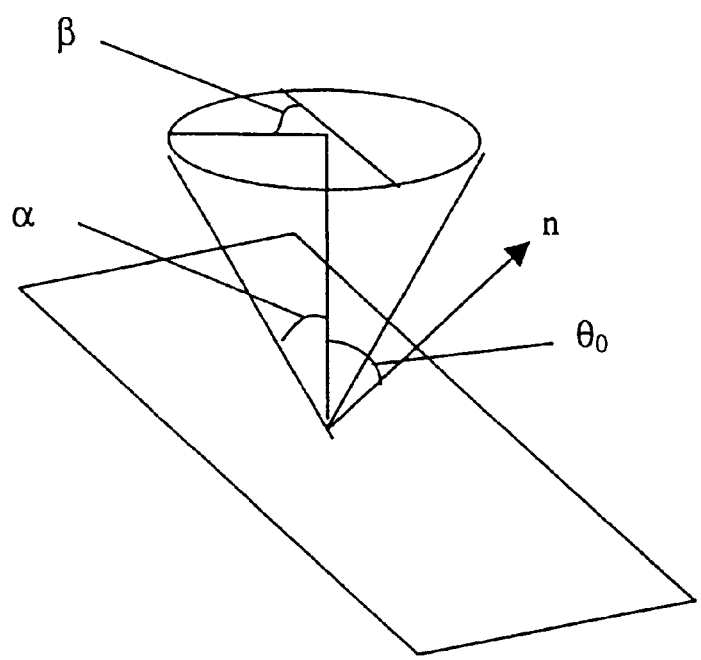
FIG. 4 shows the light beam incident on a PBS coating.

The illuminating light distribution by angle is also very important when considering the design. In most cases, the illumination is telecentric. Therefore one can assume that the light forms a cone at each pixel and these cones are parallel to each other as shown in FIG. 3. The angle between the light beam and the coating surface of the PBS is shown in FIG. 4.

For light with a cone angle $\alpha$, the actual angular deviation of the light to the designed incident angle of the PBS is distributed from $-\alpha$ to $\alpha$. The angle between the light and the reflecting surface is given by $$\phi = \cos^{-1}(\cos\alpha\cos\phi_0 - \sin\alpha\cos\beta\sin\phi_0) \quad (9)$$

where $\beta$ is the polar angle of the incident light. If the light intensity is uniformly distributed inside the cone, the relative light flux as a function of the angular deviation $\phi - \phi_0$ can be easily calculated.

However, it is expected that the light flux distribution is not uniform. Therefore an averaging over the entire beam intensity distribution has to be performed. This can be done by assuming a weighting function $W(\phi - \phi_0)$. The actual $T_p$ and $T_s$ of the beam is therefore given by $$T_P \int T_P(\theta) W(\theta - \theta_0) d\theta / \int W(\theta - \theta_0) d\theta$$

$$T_S \int T_S(\theta) W(\theta - \theta_0) d\theta / \int W(\theta - \theta_0) d\theta \quad (10)$$

So the transmission curves of different angles have to be monitored in the same time with different weight when optimizing the PBS, in order to obtain high contrast and high efficiency.

The present invention is based on the optimization of the MacNeille type PBS using the new criteria of optimizing the efficiency and the contrast ratio as given in eqs. (7) and (8). These optimization objectives are different from traditional ones in that the traditional objective is always trying to achieve a large extinction ratio. In the present invention, large extinction ratios are not required and gives moderately acceptable values of extinction, while making the acceptance angle large and the operating wavelength bandwidth as wide as possible.

Four specific embodiments of the invention will now be described and the values of the refractive indices of these 4 designs are given in Table III.

TABLE III

PBS design considered in this invention

| Design | $\theta$ | $n_g$ | $n_H$ | $n_L$ | Number of coatings |
|---|---|---|---|---|---|
| A | 45 | 1.69 | 2.35 | 1.38 | 19 |
| B | 45 | 1.64 | 1.98 | 1.46 | 27 |
| C | 52 | 1.52 | 2.35 | 1.38 | 19 |
| D | 52 | 1.52 | 1.98 | 1.46 | 25 |

The combinations in Table III are chosen for ease of fabrication and for maximum performance. In general, 52° PBS's are easier to make while 45° PBS's have more desirable incident angles. Their performances are comparable.

First embodiment of the present invention is indicated in Table IV. It is a multi-layer coating stack consisting of 19 layers that alternate layers of ZnS with a refractive index of 2.35 and layers of MgF$_2$ with a refractive index of 1.38. The layers are sandwiched between glass prisms of a refractive index of 1.69. The angle of incidence on the coating is 45°.

TABLE IV

Coating structure for embodiment #1 (design wavelength 610 nm)

| Layer No. | Refractive index | Optical thickness |
|---|---|---|
| Glass | 1.69 | — |
| 1 | 2.35 | 0.187 |
| 2 | 1.38 | 0.098 |
| 3 | 2.35 | 0.270 |
| 4 | 1.38 | 0.141 |
| 5 | 2.35 | 0.228 |
| 6 | 1.38 | 0.161 |
| 7 | 2.35 | 0.295 |
| 8 | 1.38 | 0.149 |
| 9 | 2.35 | 0.149 |
| 10 | 1.38 | 0.312 |
| 11 | 2.35 | 0.353 |
| 12 | 1.38 | 0.317 |
| 13 | 2.35 | 0.152 |
| 14 | 1.38 | 0.313 |
| 15 | 2.35 | 0.403 |
| 16 | 1.38 | 0.338 |
| 17 | 2.35 | 0.460 |
| 18 | 1.28 | 0.198 |
| 19 | 2.35 | 0.422 |
| Glass | 1.69 | — |

Figure 5:
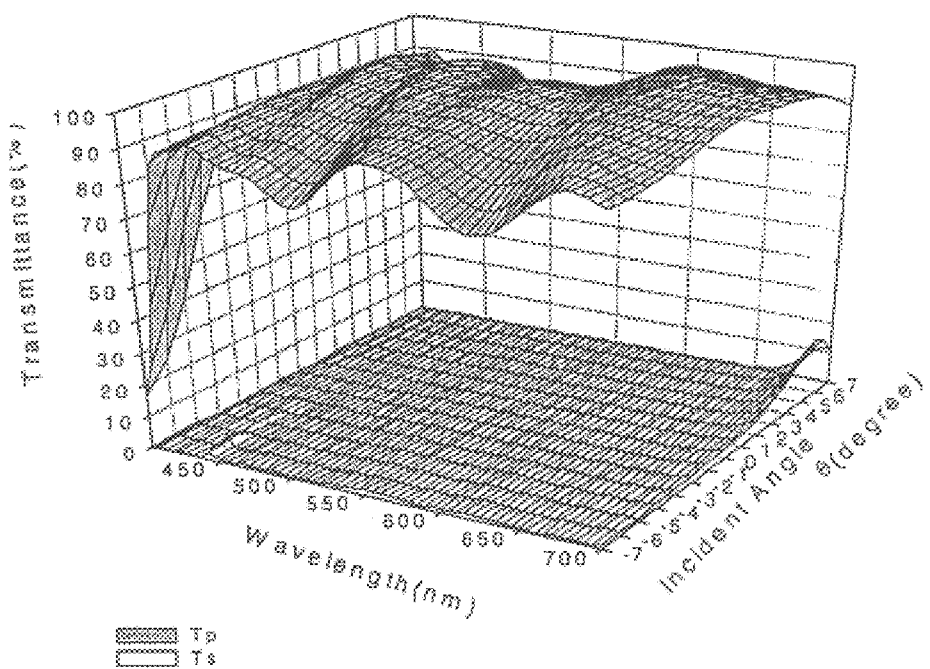
FIG. 5 shows the performance of a first embodiment of the invention.
Figure 6:
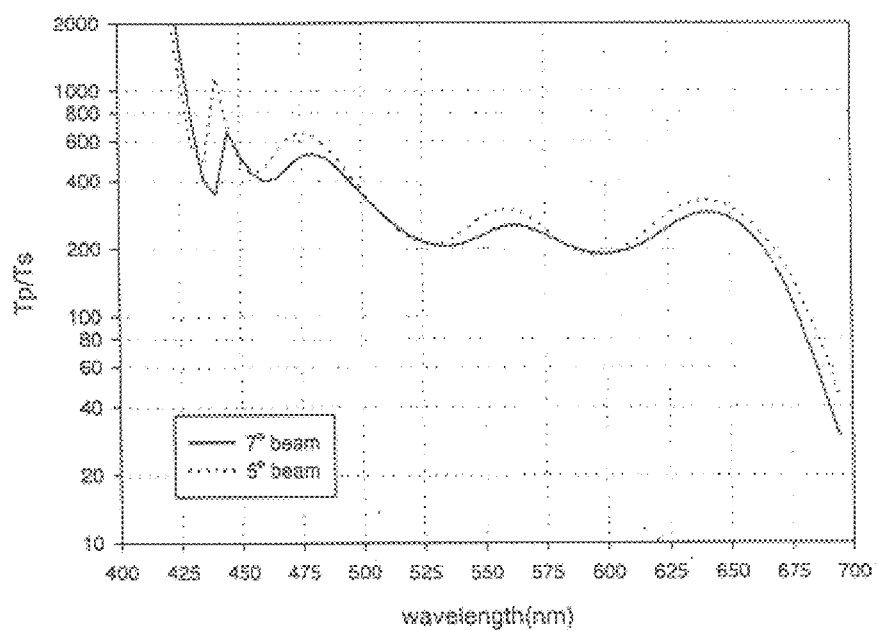
FIG. 6 shows the contrast ratios of the embodiment of FIG. 5.

The performance of the PBS of this first embodiment is shown in FIGS. 5 and 6. FIG. 5 transmission of the p- and s-polarized light as a function of the incident angle and as a function of the incident wavelength. FIG. 6 shows the extinction ratio of this PBS for the case of 5° cone angle and 7° cone angle light. From FIG. 5 it can be seen that there is good transmittance (at least 80%) of the p-polarized light over the visible spectrum from 450–700 nm and over a range of angles of from −7° to +7° relative to the angle of incidence, and good reflectance (at least 80%) of the s-polarized light. From FIG. 6 it can be observed that the extinction ratio, ie the ration of the transmittance of the p-polarized light to the transmittance of the s-polarized light is between 200 and 400 for the major part of the visible spectrum. At shorter wavelengths there is a higher extinction ratio (which is good) and only at wavelengths longer than around 650 nm does the extinction ratio start to fall below the value of 256 which is acceptable for LCD projector displays. The extinction ratio is also substantially the same for both 5° and 7° cone angles.

A second embodiment of the present invention is illustrated in Table V below. This embodiment is a PBS operating with a 45° incident angle and is formed with 27 layers of coatings. The 27 layers of coatings alternate layers of $HfO_2$ having a refractive index of 1.98, with layers of $SiO_2$ having a refractive index of 1.46. These 27 layers are sandwiched between glass prisms with a refractive index of 1.52 and 1.64 respectively.

TABLE V

Coating structure for embodiment #2 (design wavelength 610 nm)

| Layer No. | Refractive index | Optical thickness |
|---|---|---|
| Glass | 1.52 | — |
| 1 | 1.98 | 0.143 |
| 2 | 1.46 | 0.224 |
| 3 | 1.98 | 0.149 |
| 4 | 1.46 | 0.266 |
| 5 | 1.98 | 0.188 |
| 6 | 1.46 | 0.277 |
| 7 | 1.98 | 0.182 |
| 8 | 1.46 | 0.314 |

TABLE V-continued

Coating structure for embodiment #2 (design wavelength 610 nm)

| Layer No. | Refractive index | Optical thickness |
|---|---|---|
| 9 | 1.98 | 0.204 |
| 10 | 1.46 | 0.334 |
| 11 | 1.98 | 0.218 |
| 12 | 1.46 | 0.329 |
| 13 | 1.98 | 0.236 |
| 14 | 1.46 | 0.330 |
| 15 | 1.98 | 0.260 |
| 16 | 1.46 | 0.363 |
| 17 | 1.98 | 0.317 |
| 18 | 1.46 | 0.371 |
| 19 | 1.98 | 0.268 |
| 20 | 1.46 | 0.397 |
| 21 | 1.98 | 0.350 |
| 22 | 1.46 | 0.392 |
| 23 | 1.98 | 0.346 |
| 24 | 1.46 | 0.482 |
| 25 | 1.98 | 0.341 |
| 26 | 1.46 | 0.518 |
| 27 | 1.98 | 0.343 |
| Glass | 1.64 | — |

Figure 7:
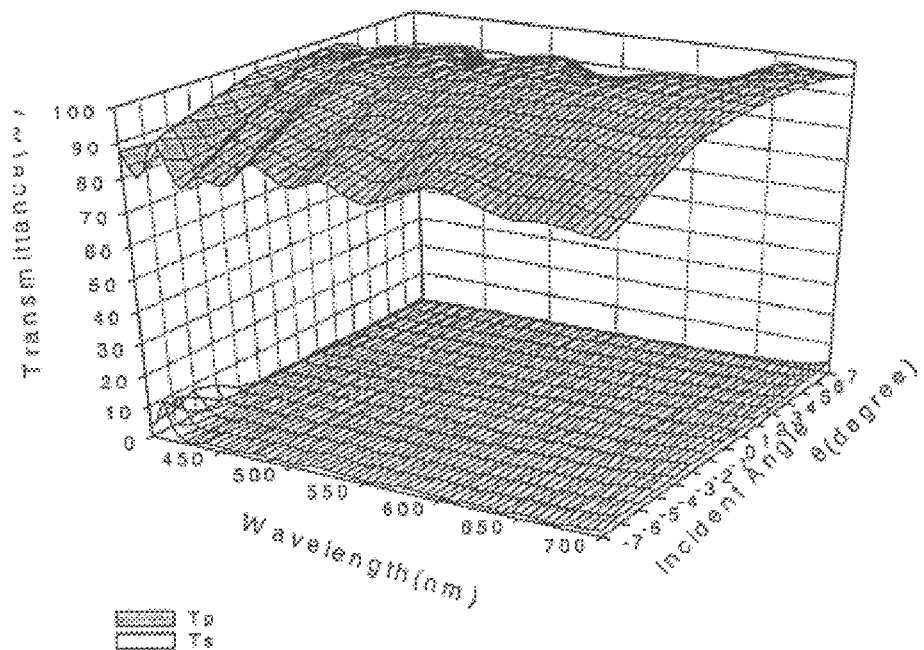
FIG. 7 shows the performance of a second embodiment of the invention.
Figure 8:
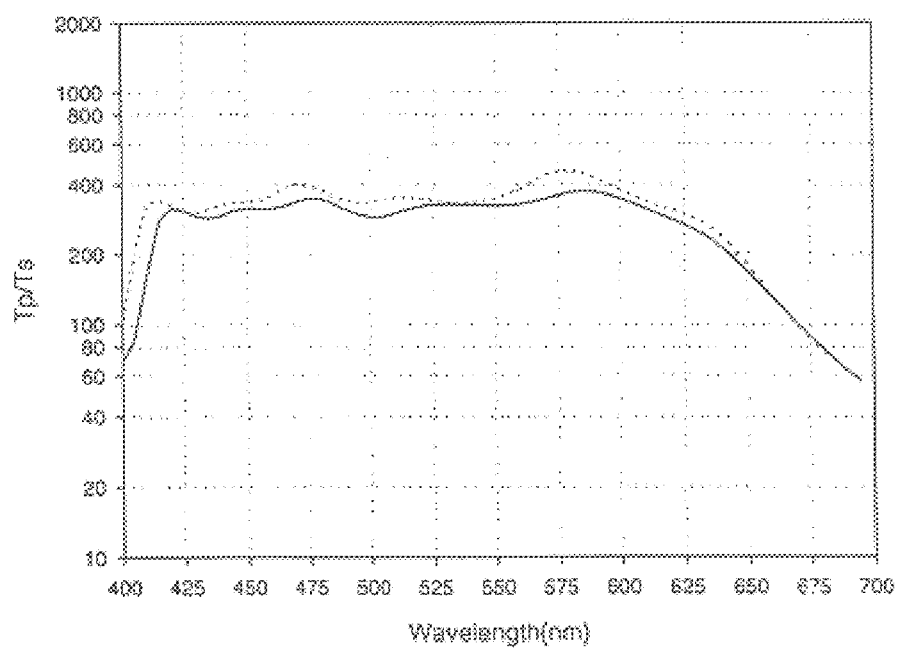
FIG. 8 shows the contrast ratios of the embodiment of FIG. 7.

The performance of the PBS of this second embodiment is illustrated in FIGS. 7 and 8. FIG. 7 shows the transmission of the p- and s-polarized light as a function of the incident angle and as a function of the incident wavelength. FIG. 8 shows the extinction ratio of this PBS for the case of 5° cone angle and 7° cone angle light. FIG. 7 shows that there is good transmission (at least 80%) of the p-polarized light over substantially the entire visible spectrum from 450 nm to 700 nm and good reflectance (at least 80%) of the s-polarized light, while FIG. 8 shows that the extinction ratio is approximately 300 from about 420 nm to just over 600 nm, and thus an acceptable extinction ratio is possible for almost the entire visible spectrum for an LCD projector display. The extinction ratio is also substantially the same for both 5° and 7° cone angles.

A third embodiment of the present invention is described in Table VI below. This embodiment is a PBS designed to operate with a 52° incident angle, and is formed with 19 layers of coatings that alternate layers of ZnS having a refractive index of 2.35 with layers of $MgF_2$ having a refractive index of 1.38. These layers are sandwiched between prisms of glass having a refractive index of 1.52.

TABLE VI

Coating structure for embodiment #3 (design wavelength 610 nm)

| Layer No. | Refractive index | Optical thickness |
|---|---|---|
| Glass | 1.52 | — |
| 1 | 2.35 | 0.149 |
| 2 | 1.38 | 0.08 |
| 3 | 2.35 | 0.180 |
| 4 | 1.38 | 0.251 |
| 5 | 2.35 | 0.141 |
| 6 | 1.38 | 0.249 |
| 7 | 2.35 | 0.162 |
| 8 | 1.38 | 0.309 |
| 9 | 2.35 | 0.150 |
| 10 | 1.38 | 0.317 |
| 11 | 2.35 | 0.355 |
| 12 | 1.38 | 0.310 |
| 13 | 2.35 | 0.155 |
| 14 | 1.38 | 0.297 |
| 15 | 2.35 | 0.412 |
| 16 | 1.38 | 0.334 |
| 17 | 2.35 | 0.449 |

TABLE VI-continued

Coating structure for embodiment #3 (design wavelength 610 nm)

| Layer No. | Refractive index | Optical thickness |
|---|---|---|
| 18 | 1.28 | 0.223 |
| 19 | 2.35 | 0.419 |
| Glass | 1.52 | — |

Figure 9:
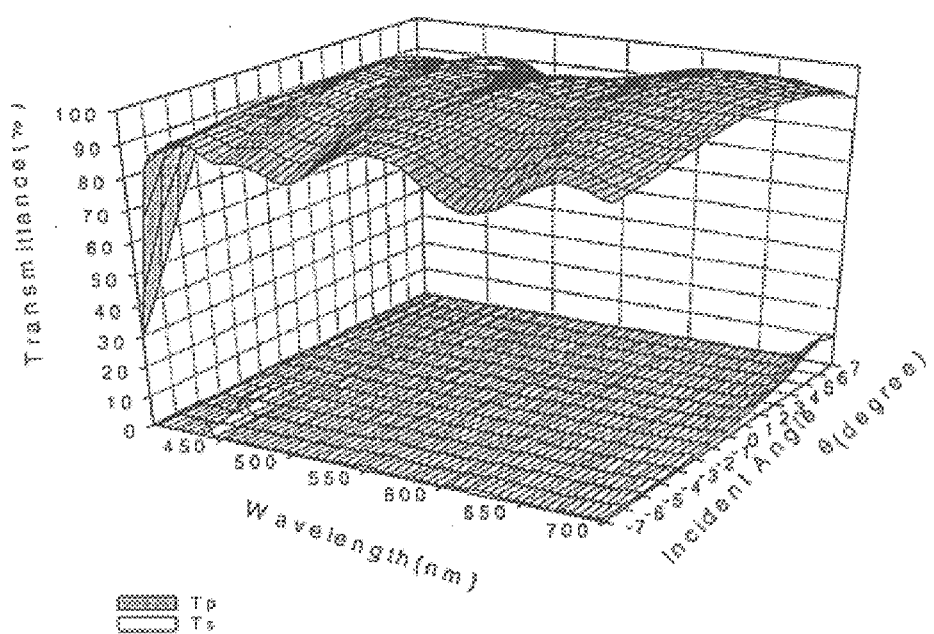
FIG. 9 shows the performance of a third embodiment of the invention.
Figure 10:
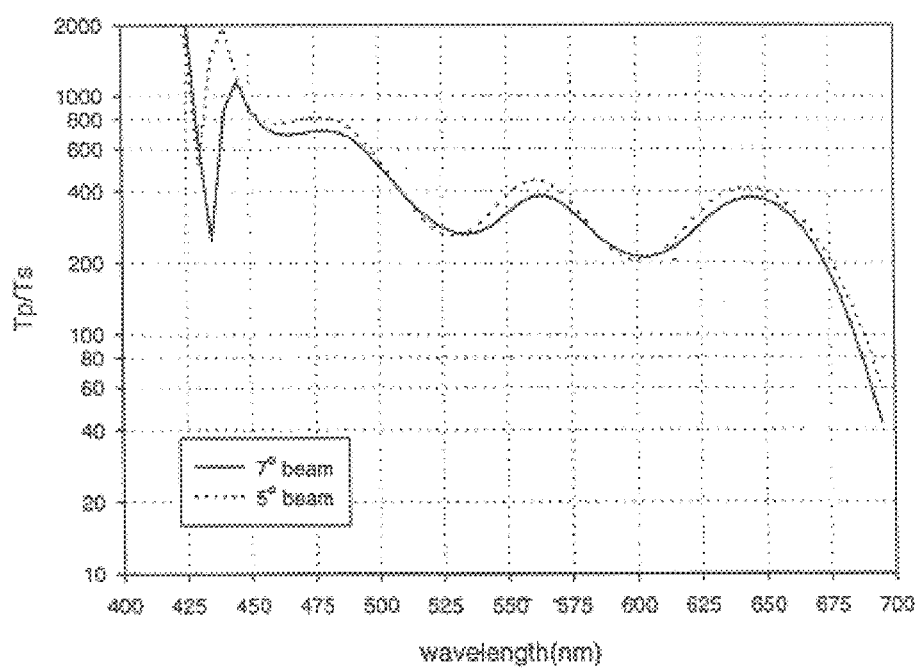
FIG. 10 shows the contrast ratios of the embodiment of FIG. 9.

The performance of the PBS of this third embodiment is shown in FIGS. 9 and 10. FIG. 9 shows the transmission of the p- and s-polarized light as a function of the incident angle and as a function of the incident wavelength. FIG. 10 shows the extinction ratio of the PBS of this third embodiment for the case of 5° cone angle and 7° cone angle light. As can be seen from FIG. 9 there is a good transmission (at least 80%) of the p-polarized light throughout the entire visible spectrum and at incident angles between ±7° of the normal incident angle, and good reflectance (at least 80%) of the s-polarized light. From FIG. 10 it can be seen that the extinction ratio is at p to a wavelength of about 670 nm and thus an acceptable extinction ratio is obtained for use in an CD projector display. The extinction ratio is also substantially the same for both 5° and 7° angles.

A fourth embodiment of the present invention is described in Table VII. This embodiment is a PBS intended for use with a 52° incident angle and is formed with 25 layers of coatings that alternate layers of $HfO_2$ having a refractive index of 1.98 with layers of $SiO_2$ sandwiched between glass prisms having a refractive index of 1.52.

TABLE VII

Coating structure for embodiment #4 (design wavelength 610 nm)

| Layer No. | Refractive index | Optical thickness |
|---|---|---|
| Glass | 1.52 | — |
| 1 | 1.98 | 0.209 |
| 2 | 1.46 | 0.286 |
| 3 | 1.98 | 0.176 |
| 4 | 1.46 | 0.335 |
| 5 | 1.98 | 0.193 |
| 6 | 1.46 | 0.340 |
| 7 | 1.98 | 0.207 |
| 8 | 1.46 | 0.346 |
| 9 | 1.98 | 0.226 |
| 10 | 1.46 | 0.327 |
| 11 | 1.98 | 0.240 |
| 12 | 1.46 | 0.307 |
| 130 | 1.98 | 0.401 |
| 14 | 1.46 | 0.410 |
| 15 | 1.98 | 0.205 |
| 16 | 1.46 | 0.326 |
| 17 | 1.98 | 0.438 |
| 18 | 1.46 | 0.239 |
| 19 | 1.98 | 0.390 |
| 20 | 1.46 | 0.353 |
| 21 | 1.98 | 0.429 |
| 22 | 1.46 | 0.334 |
| 23 | 1.98 | 0.436 |
| 24 | 1.46 | 0.396 |
| 25 | 1.98 | 0.438 |
| Glass | 1.52 | — |

Figure 11:
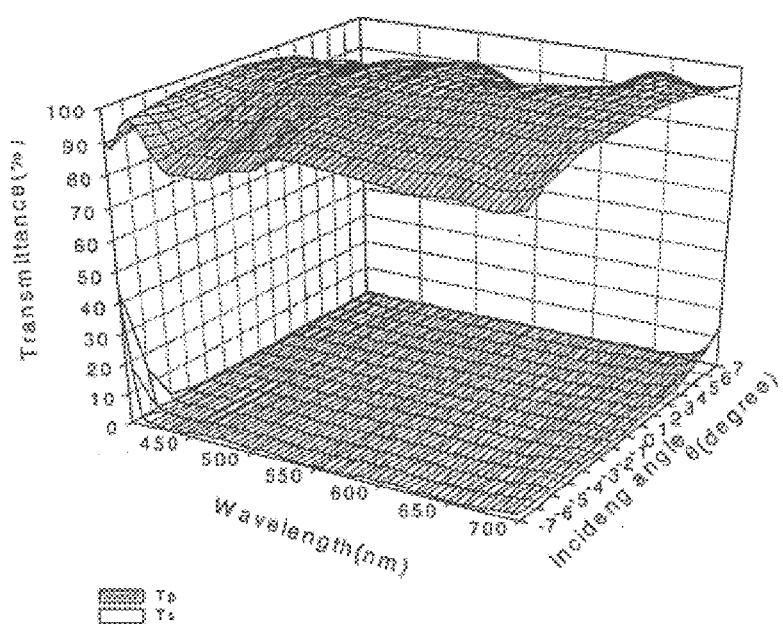
FIG. 11 shows the performance of a fourth embodiment of the invention.
Figure 12:
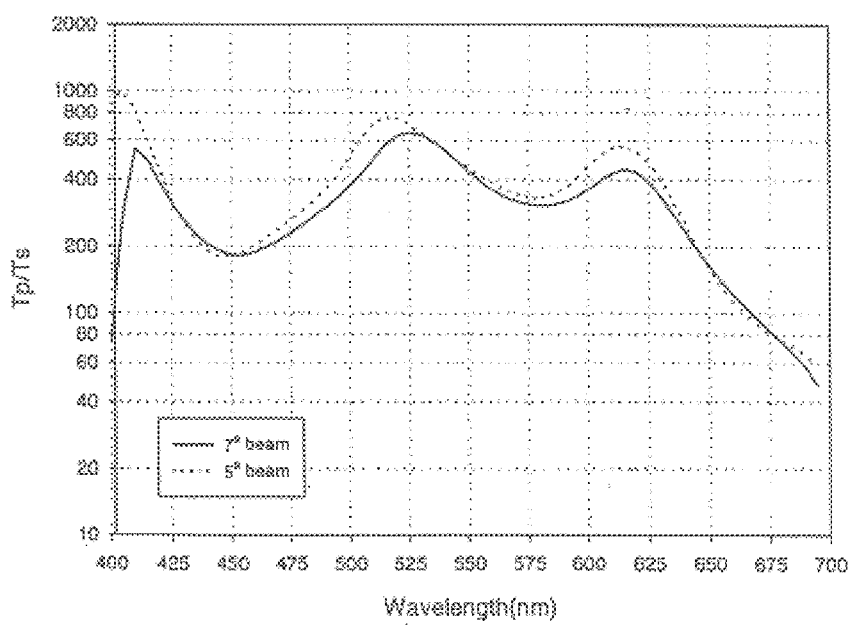
FIG. 12 shows the contrast ratios of the embodiment of FIG. 11.

The performance of the PBS of this fourth embodiment is shown in FIGS. 11 and 12. FIG. 11 shows the transmission of the p- and s-polarized light as a function of the incident angle and as a function of the incident wavelength. FIG. 12 shows the extinction ratio of this PBS for the case of 5° cone angle and 7° cone angle light. It can be seen that there is good transmission (at least 80%) of p-polarized light throughout substantially the entire visible spectrum from 400 nm to 700 nm and through a range of cone angles from ±7° to the incident angle, and good reflectance (at least 80%) of the s-polarized light, while the extinction ratio remains at least 200 up to a wavelength of about 640 m which is adequate for use in an LCD projector display. The extinction ratio is also substantially the same for both 5° and 7° cone angles.

In all the above embodiments, the extinction ratio of the PBS can be improved by adding a plate type linear polarizer at the entrance and/or at the exit plane of the PBS. Referring back to FIG. 2, in a typical application of this PBS to a projection display, a linear polarizer 1 which passes the s-polarized light can be added to the front surface of the PBS. This pre-polarizer 1 will help to eliminate the unwanted p-polarization significantly, thus improving the extinction ratio of the PBS. To improve the extinction ratio even further, a post-polarizer 2 which passes only p-polarized light can be added at the output plane of the PBS. Since the light valve 3 changes the polarization of the light from s- to p-polarized, the background light or dark state will mostly be s-polarized. This background can be reduced by the post-polarizer to give extremely high extinction ratios.

What is claimed is:

1. A polarizing beam splitter comprising a coating sandwiched between two glass prisms, said coating consisting of alternating layers of a first dielectric material having a first relatively high refractive index and a second dielectric material having a second relatively low refractive index, wherein the refractive indices of the first and second layers, the optical thickness of each layer of the coating, and the refractive index of the glass prisms are chosen such that the coating is capable of transmitting p-polarized light with at least 80% efficiency over a wavelength range of about 440 nm to 680 nm and reflecting s-polarized light with at least 80% efficiency over a wavelength range of about 440 nm to 680 nm, wherein the transmission and reflectance efficiencies are maintained when the incident light at said coating is at an angle that encompasses a range of at least ±5° from an optimum incident angle.

2. A polarizing beam splitter as claimed in claim 1 wherein the transmission and reflectance efficiencies are maintained when the incident light is at an angle that encompasses a range of at least ±7° from said optimum incident angle.

3. A polarizing beam splitter as claimed in claim 1 wherein said optimum incident angle is 45±2°.

4. A polarizing beam splitter as claimed in claim 1 wherein said optimum incident angle is 52±2°.

5. A polarizing beam splitter as claimed in claim 1 wherein said coating comprises 27 layers alternately of $HfO_2$ with a refractive index of 1.98 and $SiO_2$ with a refractive index of 1.46, and wherein said glass prisms have a refractive index of 1.52 and 1.64 respectively.

6. A polarizing beam splitter comprising a coating sandwiched between two glass prisms, wherein said coating comprises 19 layers alternately of ZnS with a refractive index of 2.35 and $MgF_2$ with a refractive index of 1.38, wherein said glass prisms have a refractive index of 1.69, and wherein the optical thickness of each layer of the coating is chosen such that the coating is capable of transmitting light of a first polarization with at least 80 % efficiency over a wavelength range of about 440 nm to 680 nm and reflecting light of a second polarization with at least 80% efficiency over a wavelength range of about 440 nm to 680 nm, wherein the transmission and reflectance efficiencies are maintained when the incident light at said coating is at an angle that encompasses a range of at least ±5° from an optimum incident angle.

7. A polarizing beam splitter comprising a coating sandwiched between two glass prisms, wherein said coating comprises 19 layers alternately of ZnS with a refractive index of 2.35 and MgF$_2$ with a refractive index of 1.38, wherein said glass prisms have a refractive index of 1.52, and wherein the optical thickness of each layer of the coating is chosen such that the coating is capable of transmitting light of a first polarization with at least 80% efficiency over a wavelength range of about 440 nm to 680 nm and reflecting light of a second polarization with at least 80% efficiency over a wavelength range of about 440 nm to 680 nm, wherein the transmission and reflectance efficiencies are maintained when the incident light at said coating is at an angle that encompasses a range of at least ±5° from an optimum incident angle.

8. A polarizing beam splitter comprising a coating sandwiched between two glass prisms, wherein said coating comprises 25 layers alternately of HfO$_2$ with a refractive index of 1.98 and SiO$_2$ with a refractive index of 1.46, wherein said glass prisms have a refractive index of 1.52, and wherein the optical thickness of each layer of the coating is chosen such that the coating is capable of transmitting light of a first polarization with at least 80% efficiency over a wavelength range of about 440 nm to 680 nm and reflecting light of a second polarization with at least 80% efficiency over a wavelength range of about 440 nm to 680 nm, wherein the transmission and reflectance efficiencies are maintained when the incident light at said coating is at an angle that encompasses a range of at least ±5° from an optimum incident angle.

9. A LCD projector display comprising a LCD array, an input light source, and a polarizing beam splitter adapted to polarize incident light from said input light source and to direct said polarized light onto said LCD array and to transmit light reflected and repolarized from said LCD array, wherein said beam splitter comprises a coating consisting of alternating layers of a first dielectric material having a relatively high refractive index and a second dielectric material having a relatively low refractive index sandwiched between two glass prisms, and is adapted to transmit p-polarized light with at least 80% efficiency over a wavelength range of about 440 nm to 680 nm and to reflect s-polarized light with at least 80% efficiency over a wavelength range of about 440 nm to 680 nm, wherein the transmission and reflectance efficiencies are maintained when the incident light from said light source is at an angle at said coating that encompasses a range of at least ±5° from an optimum incident angle.

10. A display as claimed in claim 9 further comprising a pre-polarizer located between said input light source and said beam splitter.

11. A display as claimed in claim 9 further comprising a post-polarizer located between said beam splitter and an output.

12. A display as claimed in claim 9 wherein the transmission and reflectance efficiencies are maintained when the incident light is at an angle that encompasses a range of at least ±7° from said optimum incident angle.

13. A display as claimed in claim 9 wherein said optimum incident angle is 45±2°.

14. A display as claimed in claim 9 wherein said optimum incident angle is 52±2°.

15. A display as claimed in claim 9 wherein said coating comprises 27 layers alternately of HfO$_2$ with a refractive index of 1.98 and SiO$_2$ with a refractive index of 1.46, and wherein said glass prisms have a refractive index of 1.52 and 1.64 respectively.

16. A LCD projector display comprising a LCD array, an input light source, and a polarizing beam splitter adapted to polarize incident light from said input light source and to direct said polarized light onto said LCD array and to transmit light reflected and repolarized from said LCD array, wherein said beam splitter comprises a coating sandwiched between two glass prisms, wherein said coating comprises 19 layers alternately of ZnS with a refractive index of 2.35 and MgF$_2$ with a refractive index of 1.38, wherein said glass prisms have a refractive index of 1.69, and wherein said beam splitter is adapted to transmit light of a first polarization with at least 80% efficiency over a wavelength range of about 440 nm to 680 nm and to reflect light of a second polarization with at least 80% efficiency over a wavelength range of about 440 nm to 680 nm, wherein the transmission and reflectance efficiencies are maintained when the incident light from said light source is at an angle at said coating that encompasses a range of at least ±5° from an optimum incident angle.

17. A LCD projector display comprising a LCD array, an input light source, and a polarizing beam splitter adapted to polarize incident light from said input light source and to direct said polarized light onto said LCD array and to transmit light reflected and repolarized from said LCD array, wherein said beam splitter comprises a coating sandwiched between two glass prisms, wherein said coating comprises 19 layers alternately of ZnS with a refractive index of 2.35 and MgF$_2$ with a refractive index of 1.38, wherein said glass prisms have a refractive index of 1.52, and wherein said beam splitter is adapted to transmit light of a first polarization with at least 80% efficiency over a wavelength range of about 440 nm to 680 nm and to reflect light of a second polarization with at least 80% efficiency over a wavelength range of about 440 nm to 680 nm, wherein the transmission and reflectance efficiencies are maintained when the incident light from said light source is at an angle at said coating that encompasses a range of at least ±5° from an optimum incident angle.

18. A LCD projector display comprising a LCD array, an input light source, and a polarizing beam splitter adapted to polarize incident light from said input light source and to direct said polarized light onto said LCD array and to transmit light reflected and repolarized from said LCD array, wherein said beam splitter comprises a coating sandwiched between two glass prisms, wherein said coating comprises 25 layers alternately of Hfo$_2$ with a refractive index of 1.98 and SiO$_2$ with a refractive index of 1.46, wherein said glass prisms have a refractive index of 1.52, and wherein said beam splitter is adapted to transmit light of a first polarization with at least 80% efficiency over a wavelength range of about 440 nm to 680 nm and to reflect light of a second polarization with at least 80% efficiency over a wavelength range of about 440 nm to 680 nm, wherein the transmission and reflectance efficiencies are maintained when the incident light from said light source is at an angle at said coating that encompasses a range of at least ±5° from an optimum incident angle.

\* \* \* \* \*

UNITED STATES PATENT AND TRADEMARK OFFICE
CERTIFICATE OF CORRECTION

PATENT NO. : 6,462,873 B1
DATED : October 8, 2002
INVENTOR(S) : Hoi Sing Kwok et al.

It is certified that error appears in the above-identified patent and that said Letters Patent is hereby corrected as shown below:

<u>Title page,</u>
Item [73], add the Assignee information:
-- The Hong Kong University of Science and Technology
Kowloon, Hong Kong --

Signed and Sealed this

Fourth Day of February, 2003

JAMES E. ROGAN
*Director of the United States Patent and Trademark Office*